Feb. 24, 1959 R. B. GRAY 2,874,569
GAS METER DIAPHRAGM
Filed April 5, 1955
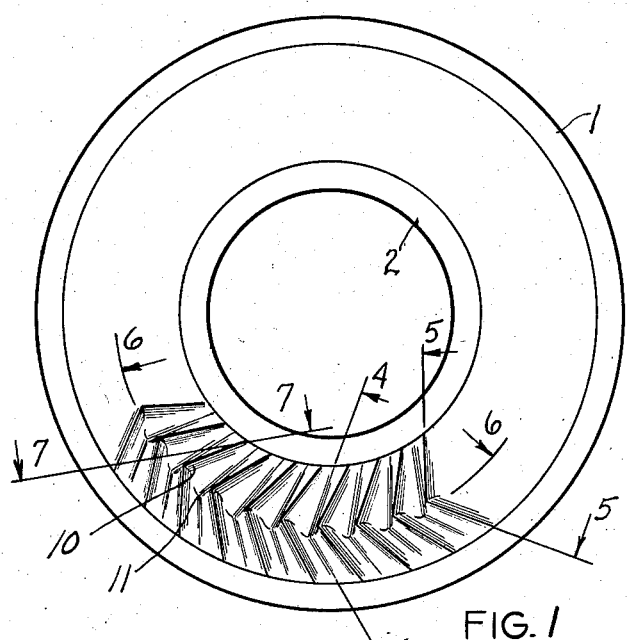
FIG. 1
FIG. 3
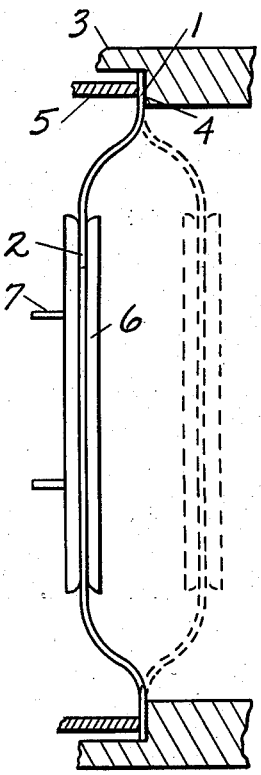
FIG. 2
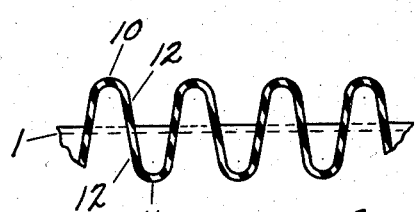
FIG. 4
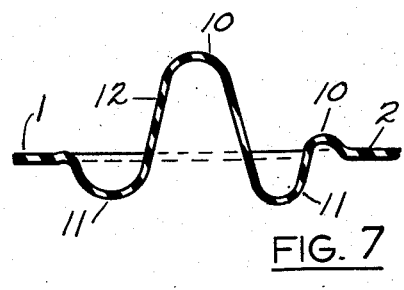
FIG. 5
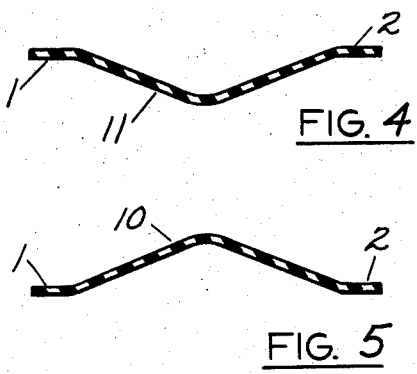
FIG. 6
FIG. 7
INVENTOR.
Robert B Gray
BY
Ralph Hammar
attorney

United States Patent Office 2,874,569
Patented Feb. 24, 1959

2,874,569
GAS METER DIAPHRAGM

Robert B. Gray, Erie, Pa., assignor to American Meter Company, Incorporated, Erie, Pa., a corporation of Delaware Application April 5, 1955, Serial No. 499,324

3 Claims. (Cl. 73—279)

In a pan type gas meter diaphragm, the diaphragm is rigidly clamped at its rim or peripheral edge to the meter casing and is also rigidly clamped at its center to a disk connected to a flag rod which transmits the reciprocation of the diaphragm to the meter valves and registering mechanism, for example, as shown in Patent 2,741,122. The gas pressure forces the center of the diaphragm alternately first on one and then on the other side of the plane of the rim of the diaphragm thereby expanding and collapsing the measuring chambers of which the diaphragm is a part. The accommodation of the reciprocatory movement requires that the diaphragm deflect in both radial and circumferential directions which deflection should not cause wrinkling or localized stress. This invention is intended to provide a diaphragm which accomplishes these results. In a preferred form, the diaphragm has circumferentially directed herringbone corrugations alternately projecting from opposite sides of the median plane of the diaphragm, the corrugations increasing in depth outward from the center of the diaphragm and inward from the rim of the diaphragm so as to have a maximum depth at the apexes of the herringbones. Such a diaphragm deflects smoothly in either direction along its axis without any localized stress. The diaphragm is adapted to manufacture from fabric reinforced synthetic rubber or other elastomers having the required resistance to the chemical compounds found in natural or manufactured gas.

In the drawing, Fig. 1 is a plan view of a gas meter diaphragm, Fig. 2 is a diagrammatic edge view indicating the movement of the diaphragm during the operation of a gas meter, Fig. 3 is a fragmentary section of the gas meter diaphragm material, Fig. 4 is a section on line 4—4 of Fig. 1, Fig. 5 is a section on line 5—5 of Fig. 1, Fig. 6 is a section on arc 6—6 of Fig. 1, and Fig. 7 is a section on line 7—7 of Fig. 1.

The diaphragm is of annular shape having at its outer periphery a rim 1 and at its inner periphery a rim 2, the rims 1 and 2 being generally in the same plane in the unstressed condition of the diaphragm. The outer rim 1 is sealed to the inside of a gas measuring chamber, a part of which is diagrammatically indicated at 3 in Fig. 2, for example, by being pressed against a shoulder 4 by a clamping ring 5. The inner rim 2 is clamped between two metal disks 6 to the outer of which is fixed a bracket 7 for the usual flag rod. When secured in place, the diaphragm forms a flexible wall of a gas measuring chamber which is expanded and collapsed as the diaphragm is moved from the full line position shown in Fig. 2 to the dotted line position shown in Fig. 2 thereby effecting the gas measuring operation. The diaphragm may be readily made from a synthetic rubber or elastomer 8 reinforced with a fabric 9 as shown in Fig. 3. The fabric 9 preferably is of one of the non-stretchable fibers such as nylon or glass and the elastomer 8 may be one of the synthetic rubbers which is not seriously affected by the chemicals present in natural or manufactured gas or one of the flexible or film forming plastics such as "Teflon," polyester, polyethylene, etc.

While the diaphragm is going through its measuring stroke as indicated in Fig. 2, it is obvious that the portion of the diaphragm between the inner and outer rims 1 and 2 must change dimensions both radially and circumferentially and this change in dimensions preferably should take place uniformly without any localized stress which would cause non-uniformity in the operation of the gas meter and localized stresses in the diaphragm leading to premature failure.

In order to prevent the localized stress in the diaphragm during its measuring stroke, there are provided herringbone corrugations 10 and 11 which as shown in Figs. 4, 5 and 6 alternately project axially from opposite sides of the median plane of the diaphragm.

Each of the corrugations is circumferentially directed or inclined at an angle to the radial and the corrugations meet between the inner and outer rims 1 and 2 thereby providing the herringbone shape illustrated in Fig. 1. As shown in Figs. 4 and 5, both of the corrugations 10 and 11 increase in depth radially inward from the outer rim 1 and radially outward from the inner rim 2 reaching a maximum depth at the apexes of the herringbones. The increase in depth of the corrugations provides additional flexibility between the rims 1 and 2. Although the change in depth in the corrugations is indicated as uniform in Figs. 4 and 5, it is not essential that the change be absolutely uniform as shown.

In the unstressed position of the diaphragm transverse to the width of the diaphragm, a section on any line as shown in Fig. 7 will result in corrugations of gradually increasing depth radially inward from the outer rim 1 and radially outward from the inner rim 2. Because the corrugations are of greatest depth midway between the rims 1 and 2, the stretching of the diaphragm in a radial direction can be confined to a hinging of the sides 12 of the corrugations. A section on any circumferential arc as shown in Fig. 6 will have corrugations 10 on one side of the median plane of the diaphragm and corrugations 11 on the other side of the median plane. The corrugated shape provides for controlled hinging of the sides 12 of the diaphragm. Accordingly, as the diaphragm is moved during its measuring stroke from the full line to the dotted line position of Fig. 2, the corrugations 10 and 11 provide a controlled flexibility in both radial and circumferential directions which prevents any non-uniformity in the movement of the diaphragm or any localized stress which would cause premature diaphragm failure. No attempt has been made in Fig. 2 to illustrate the shape of the corrugations in the extreme deflected position of the diaphragm, but it is believed that the action is evident from the circumferential and radial section of Figs. 6 and 7.

Because of the herringbone shape of the corrugations 10 and 11, there is no tendency for the rims 1 and 2 to rotate as the diaphragm deflects in its measuring stroke. If the corrugations 10 were not of herringbone shape but were spirally inclined in one direction between the inner and outer rims 1 and 2, there would be a tendency for relative rotation of the rims as the diaphragm deflected. Since the outer rim is always fixed to the gas meter casing, this would mean that the disk 6 at the center of the diaphragm would rotate as the diaphragm had its reciprocatory measuring movement. This would require a swivel connection between the flag rod bracket 7 and the disk 6 but except for this feature the operation would be substantially the same as with the herringbone corrugations.

The reinforcing fabric 9 of the diaphragm may be of the usual woven fabric. It is also possible to use a felt-like fabric which has the advantage of having the same resistance to deformation in all directions. The usual woven fabric has less resistance along the bias than in other directions. The shape shown is also adapted to leather diaphragms which can be formed as shown by soaking in water and holding over a form while drying. A screen having the shape of the finished diaphragm can be used to make a glass or other fiber felt reinforced for the diaphragm so that no deformation of the felt will be required during the molding of the diaphragm. Because many of the fibers which are inert to gas do not naturally felt, an adhesive such as a synthetic rubber or plastic cement coating on the fibers is used to cause the fibers to stick together in the random orientation characteristic of felt. The felted fabric may be impregnated with the rubber or plastic prior to molding so as to make the molded diaphragm impervious. When the diaphragm is made of one of the elastomers such as synthetic rubber, the elastomer with its fabric reinforcement 9 is readily formed to the corrugated shape during the molding operation.

What is claimed as new is:

1. An annular pan type gas meter diaphragm having inner and outer rims in the median plane of the diaphragm for fastening respectively to a disk and to the housing of a gas measuring chamber and an annular portion between the rims with angularly spaced circumferentially directed herringbone corrugations alternately projecting from opposite sides of the median plane of the diaphragm.

2. An annular pan type gas meter diaphragm having inner and outer rims in the median plane of the diaphragm for fastening respectively to a disk and to the housing of a gas measuring chamber and an annular portion between the rims with angularly spaced circumferentially directed herringbone corrugations bridging the space between the rims, said corrugations alternately projecting axially from opposite sides of the median plane of the diaphragm, said corrugations increasing in depth radially inward from the outer rim and radially outward from the inner rim.

3. An annular pan type gas meter diaphragm of fabric reinforced molded synthetic elastomer having inner and outer rims in the median plane of the diaphragm for fastening respectively to a disk and to the housing of a gas measuring chamber and an annular portion between the rims with angularly spaced circumferentially directed herringbone corrugations bridging the space between the rims, said corrugations alternately projecting axially from opposite sides of the median plane of the diaphragm.

References Cited in the file of this patent

UNITED STATES PATENTS

| | | |
|---|---|---|
| 56,694 | Blake | July 31, 1866 |
| 116,669 | Blake | July 4, 1871 |
| 1,206,365 | Payne | Nov. 28, 1916 |
| 1,583,203 | Tolhurst | May 4, 1926 |
| 1,801,896 | Bates | Apr. 21, 1931 |
| 2,742,785 | St. Clair | Apr. 24, 1956 |
| 2,760,260 | Melchior | Aug. 28, 1956 |
| 2,798,507 | St. Clair | July 9, 1957 |

FOREIGN PATENTS

| | | |
|---|---|---|
| 644,253 | France | June 4, 1928 |
| 101,286 | Australia | June 8, 1937 |
| 676,415 | Great Britain | July 30, 1952 |
| 686,314 | Great Britain | Jan. 21, 1953 |